United States Patent Office 3,306,928
Patented Feb. 28, 1967

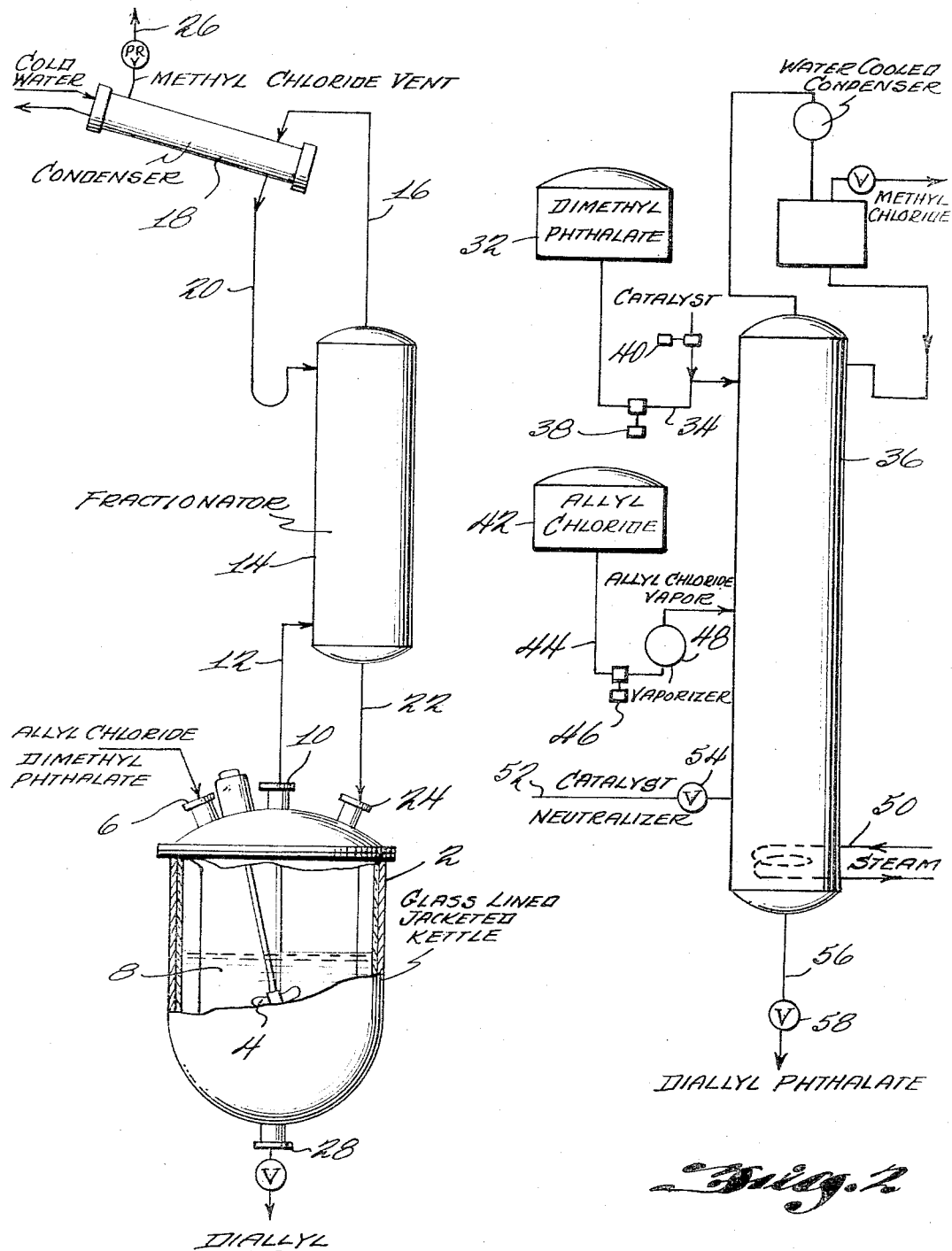

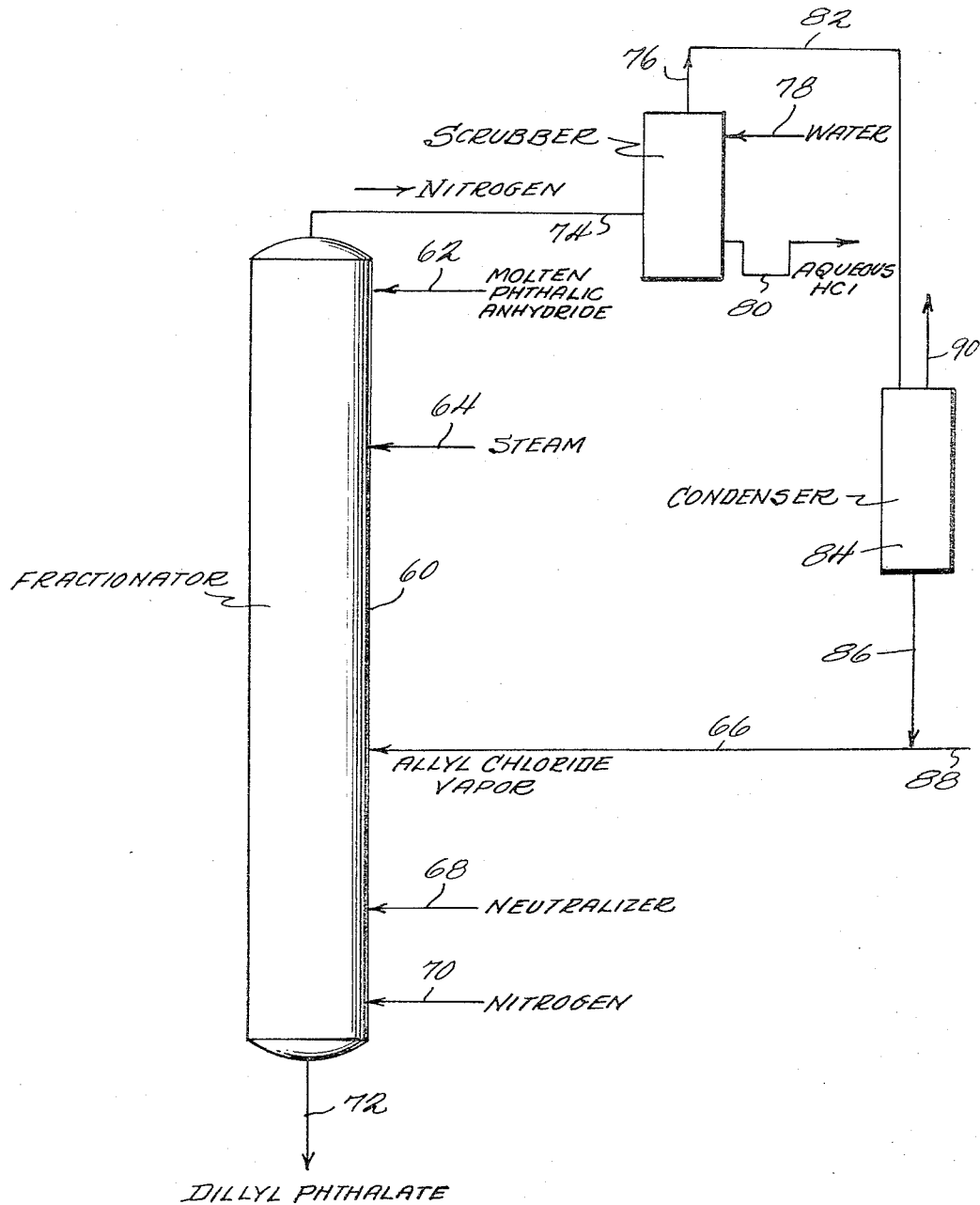

3,306,928
PROCESS OF PREPARING DIALKENYL ESTERS OF BENZENE POLYCARBOXYLIC ACIDS
John H. Lux, Charlestown, Md., and Ernest O. Ohsol, Wilmington, Del., assignors to Haveg Industries, Inc., New Castle, Del., a wholly-owned subsidiary of Hercules Powder Company, a corporation of Delaware
Filed Nov. 27, 1962, Ser. No. 240,295
23 Claims. (Cl. 260—475)

This invention relates to the preparation of unsaturated esters of aromatic polycarboxylic acids.

Diallyl phthalate is conventionally prepared by reacting allyl alcohol with phthalic acid, phthalic anhydride and phthaloyl chloride, e.g., see Magrane Patent 2,405,842, Derr Patent 2,557,639 and Kropa Patent 2,249,768. It is also conventional, as shown in Magrane and in the Pollack Patent 2,275,467, to react allyl chloride with sodium monoallyl phthalate. Such procedures suffer from the disadvantage that relatively expensive allyl alcohol must be used as a starting material or that it is necessary to form a partial sodium salt and then a second step is required to further react to form the diallyl phthalate. Such procedures also suffer from the disadvantage of low yields.

It has also been proposed in De Benedictis Patent 2,939,879 to prepare diallyl phthalate or the like by condensing allyl chloride with an alkali metal salt of phthalic acid. This process has the disadvantage that the alkali metal salt must be formed. Additionally, the yield of diallyl phthalate at best was 87% in a one step process and 90% in a two step process. Furthermore, unless the pH was controlled carefully to about neutral, i.e., pH 6 to pH 8, the yields fell off sharply.

It is an object of the present invention to make polyalkenyl esters of aromatic polycarboxylic acids by an improved procedure.

Another object is to avoid polymerization and color problems in the preparation of polyalkenyl esters of aromatic polycarboxylic acids.

A further object is to prepare diallyl phthalate from the cheapest available raw materials.

Yet another object is to conserve on the use of alkyl chlorides in preparing polyalkenyl esters of aromatic polycarboxylic acids from polyalkyl esters of the aromatic polycarboxylic acids.

A still further object is to develop an esterification process requiring the minimum size of equipment relative to production capacity.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by reacting a lower alkyl ester of an aromatic polycarboxylic acid with an alkenyl chloride having 3 to 4 carbon atoms. In the preferred form of the invention the appropriate aromatic polycarboxylic acid or anhydride, alkenyl halide and moisture are continuously added to the reaction zone. At the start of the reaction an alkyl ester of the polycarboxylic acid is added to the reaction zone and the alkyl chloride formed in situ by the reaction with the alkenyl chloride reacts with the polycarboxylic acid (or anhydride) and water to form the alkyl ester of the polycarboxylic acid and hydrogen chloride.

The process of the invention is preferably employed to form diallyl ortho-phthalate.

The invention can also be employed to prepare dimethallyl ortho-phthalate, di crotyl ortho-phthalate, allyl methallyl ortho-phthalate, diallyl terephthalate, di crotyl terephthalate, dimethallyl terephthalate, diallyl isophthalate, dimethallyl isophthalate, triallyl trimellitate, trimethallyl trimellitate, tricrotyl trimellitate, triallyl hemimellitate, trimethallyl hemimellitate, tricrotyl hemimellitate, triallyl trimesate, tetraallyl pyromellitate, tetramethallyl pyromellitate, tetracrotyl pyromellitate. As the starting benzene polycarboxylic acids, anhydrides and esters there can be used dimethyl ortho-phthalate, diethyl ortho-phthalate, diisopropyl ortho-phthalate, dibutyl ortho-phthalate, dimethyl terephthalate, dibutyl terephthalate, dimethyl isophthalate, diethyl isophthalate, trimethyl trimellitate, tributyl trimellitate, trimethyl hemimellitate, trimethyl trimesate, tributyl hemimellitate, tetramethyl pyromellitate, tetrabutyl pyromellitate, ortho-phthalic acid, ortho-phthalic anhydride, terephthalic acid, isophthalic acid, trimellitic acid, trimellitic anhydride, hemimellitic acid, hemimellitic anhydride, pyromellitic acid, pyromellitic dianhydride, monomethyl ortho-phthalate, monobutyl ortho-phthalate.

As the alkenyl chloride there can be used allyl chloride, methallyl chloride or crotyl chloride. Mixed esters can be prepared by using a mixture of two of the alkenyl chlorides.

When water is employed, e.g., when the free acid or the acid anhydride is used as a reactant, the water is preferably in the form of steam.

The reaction is carried out at a temperature of 85 to 150° C. Preferably the temperature is at least 120° C.

While the alkenyl chloride and the benzene polycarboxylic acid or derivative, e.g., phthalic anhydride, can be used in stoichiometric amounts to produce the polyalkenyl ester, preferably the alkenyl chloride is employed in excess, e.g., 5 to 100% excess over that amount required for the reaction, and the reaction is carried out to substantial extinction of the polybasic acid or derivative. The excess alkenyl chloride is normally refluxed back to the reaction zone so that in a continuous process basically stoichiometric quantities of the reactants are utilized.

While no catalyst is required for the reaction preferably there is employed 0.1–3% of an acid catalyst based on the polycarboxylic acid or derivative. Illustrative of acid catalysts are sulfuric acid, p-toluene sulfonic acid, benzene sulfonic acid, xylene sulfonic acid, d-camphor sulfonic acid, sulfonated terpenes, sulfonated ion exchange resins, e.g., sulfonated styrene-divinyl benzene (available commercially as Dowex–50), silica gel. Other conventional acid esterification catalysts can also be used. The esterification catalysts preferably are of a type which are not strong polymerization catalysts unless a polymerization inhibitor is present.

It is desirable to agitate the esterification reactor well. This can be accomplished by use of a turbo-mixer or by the use of gas sparging, e.g. with nitrogen, argon, helium, carbon dioxide or other inert gas.

Normally the reaction is carried out at atmospheric pressure although the use of a moderate vacuum speeds up the reaction at any given temperature and also helps minimize polymerization. Operation below 50 mm. Hg, is less economical, however. In a continuous through flow system with controlled residence time it is possible to operate under super atmospheric pressure at higher temperatures with the advantage that unreacted allyl chloride or the like is condensed with ordinary cooling water and returned to the reaction zone and that by product methyl chloride can also be condensed without compression.

Unless otherwise indicated all percentages and parts are by weight.

The invention will be best understood in connection with the drawing wherein:

FIGURE 1 is a partially diagrammatic view showing one batch process for carrying out the invention;

FIGURE 2 is a view showing a continuous process of carrying out the invention; and FIGURE 3 is a view showing an alternative and preferred process for carrying out the invention.

Referring to FIGURE 1 of the drawings there is provided a glass lined steam jacketed kettle 2 equipped with a stirrer 4. Dimethyl ortho phthalate (or other alkyl phthalate or trimellitate or the like) is charged into the kettle through opening 6. If a catalyst is employed it is also passed into the kettle through opening 6. Allyl chloride (or other alkenyl chloride) is then passed into the kettle 6, preferably below the level of the liquid 8. Vapors from the reaction kettle 2 go through opening 10 and line 12 to fractionator 14. The vapors then go through line 16 to condenser 18 which is cooled with cold water. The allyl chloride in the vapors is condensed in the condenser and returns via line 20 to the fractionator 14 and thence through line 22 through opening 24 to the kettle 2. The methyl chloride vapors are removed from the condenser 18 through vent 26 and can then be recovered in any convenient fashion.

By operating the condenser at pressures above 75 p.s.i.g. the methyl chloride can be recovered in liquid form.

Instead of having a separate fractionator and condenser these two units can be combined.

The diallyl phthalate can be recovered by draining it off through outlet 28 and purified by distillation. If an acid catalyst is employed it is preferably neutralized with an alkaline material such as sodium carbonate, sodium bicarbonate, sodium hydroxide, potassium carbonate, potassium hydroxide, calcium hydroxide, anion exchange resins, e.g. Amberlite IRA–400 (a quaternary ammonium derivative of chloromethylated styrene-divinyl benzene copolymer). Low boilers can be removed from the reaction liquid with the aid of nitrogen or $CO_2$.

FIGURE 2 illustrates a continuous process wherein dimethyl ortho phthalate (or other alkyl ester of a benzene polycarboxylic acid) from reservoir 32 is added through line 34 into the top portion of column 36. The rate of addition is controlled by metering pump 38. Catalyst, if desired, e.g. p-toluene sulfonic acid, is introduced into line 34 through metering pump 40. Allyl chloride (or other alkenyl chloride) from reservoir 42 is introduced through line 44 into the mid section of column 36. The flow of liquid allyl chloride is controlled by pump 46. Prior to entering the column 36 the allyl chloride is vaporized in vaporizer 48. The bottom portion of the column 36 is heated, e.g. by steam, through coils 50. There can be added a catalyst neutralizer, e.g. sodium carbonate, through line 52 and control valve 54 although it is not essential to add the neutralizer. The diallyl phthalate formed is removed from the column at the bottom through line 56 and valve 58.

The preferred form of the invention is shown in FIGURE 3 which illustrates a continuous process in which there is provided a fractionator or distillation column 60. In the top section of the column there is continuously fed molten benzene polycarboxylic acid or anhydride, e.g. phthalic anhydride, through line 62. Preferably there is dissolved in the phthalic anhydride or the like an acid catalyst, e.g. p-toluene sulfonic acid. About 4 to 8 plates below the top feed there is introduced steam through line 64. The steam is introduced into the liquid on the plate through a sparging ring. About 8 to 10 plates below the steam inlet allyl chloride in either vapor or liquid form is fed into the column from line 66. Further down the column a neutralizer, e.g. aqueous sodium carbonate, is introduced through line 68. A stripping gas such as nitrogen, argon or the like is introduced through line 70. The effluent from the bottom of the reactor containing the desired polyalkenyl ester of the benzene polycarboxylic acid, e.g. diallyl phthalate, is removed from the bottom of the fractionator through line 72. (The product can be cooled and washed or it can be fed to a vacuum distillation unit for recovery of the diallyl phthalate.)

Vapors formed in the reaction are swept upward through column 60 with the aid of the nitrogen (or other inert gas introduced through line 70). The vapors leave the top of the column through line 74 and go to a scrubber 76 to remove by-product HCl. Water enters the scrubber through line 78 and absorbs HCl in the scrubber and aqueous hydrochloric acid is recovered from the bottom of the scrubber through line 80. In place of pure water there can be used an alkaline solution, e.g. aqueous sodium hydroxide, potassium hydroxide, calcium hydroxide, or barium hydroxide, in which case the HCl will be converted to the appropriate salt in the scrubber. The excess allyl chloride in vapor form exist from the top of the scrubber through line 82 and passes to condenser 84 wherein the major part of the excess allyl chloride is condensed and is recycled to the reaction column 60 via lines 86 and 66. Make up allyl chloride enters column 60 through lines 88 and 66. The vapors leaving the top of condenser 84 through line 90 contain nitrogen and small amounts of allyl chloride. The latter can be recovered by compression and condensation, adsorption on activated carbon or other suitable means.

The reaction column is designed that the liquid holdup on the plates is considerable so as to provide adequate time for the transesterification reaction to occur. The temperature on the individual plates can be controlled by providing steam coils within the liquid at several plates in the column.

When making diallyl phthalate temperatures of 120 to 140° C. are maintained in the column with the higher temperatures being established near the allyl chloride inlet.

In order to start the continuous reaction illustrated by FIGURE 3 it is necessary to initially add an ester of the benzene carboxylic acid, e.g. dimethyl phthalate to the fractionator but thereafter it is only necessary to add the polycarboxylic acid or anhydride.

The equations for the reactions which are believed to occur in the fractionator are as follows:

$$P.A. + 2CH_3Cl + H_2O \rightarrow DMP + 2HCl$$
$$DMP + 2CH_2=CHCH_2Cl \rightarrow DAP + 2CH_3Cl$$

In the equations the following abbreviations are employed:

P.A. = phthalic anhydride
DMP = dimethyl ortho phthalate
DAP = diallyl ortho phthalate Unless otherwise indicated all parts and percentages are by weight.

EXAMPLE 1

500 lbs. of dimethyl ortho phthalate were charged to a steam jacketed reaction kettle equipped with a turbomixer. Steam was turned on to the jacket, and the reactor temperature brought up to 120° C. and 10 lbs. of p-toluene sulfonic acid were added and dissolved. Vapors from the reactor passed through a reflux condenser equipped with a pressure regulator set to release at 15 p.s.i.g. Allyl chloride was introduced into the reactor below the liquid level and over a period of 8 hours 425 lbs. were passed in. Excess unreacted allyl chloride and methyl chloride vapors passed up through the reflux condenser which was set up with a liquid return line to return condensed allyl chloride vapors to the reactor underneath the liquid level. Methyl chloride contaminated with some allyl chloride was vented from the condenser.

After all the allyl chloride had been added, heating was continued until vapor evolution had ceased. Then 30 lbs. of 10% aqueous sodium carbonate solution was added to neutralize the catalyst and the reaction liquid was stripped of low boilers with the aid of nitrogen gas. The reaction product was then allowed to cool to below 70° C. and washed several times with water using moderate agitation and then decantation to remove the water layer.

After draining off the aqueous layer the product was vacuum distilled with the diallyl ortho phthalate coming over at 140 to 150° C. at Hg 2 mm. pressure.

EXAMPLE 2

Into the top section of the fractionator or distillation column shown in FIGURE 3 there was initially fed 500 lbs. of liquid dimethyl ortho phthalate. Thereafter there was fed into the top of this column molten phthalic anhydride at the rate of 1000 lbs./hour. Dissolved in the phthalic anhydride stream was 18 lbs./hr. of p-toluene sulfonic acid. At a distance of 6 plates below the top feed, 125 lbs./hr. of steam was introduced into the liquid on the plate through a sparging ring. 10 plates below the steam inlet there was introduced 1500 lbs./hr. of liquid allyl chloride. Below the allyl chloride inlet there was introduced a stream of 55 lbs./hr. of 10% aqueous sodium carbonate and a flow of 60 lbs./hr. of nitrogen as a stripping gas (as shown in FIGURE 3). The reaction column was operated at a pressure of about 10 p.s.i.g.

The effluent from the bottom of the column was fed to a vacuum distillation unit maintained at 1-2 mm. for recovery overhead of a distilled diallyl ortho phthalate product in an amount of about 1600 lbs./hr.

The vapors leaving the top of the fractionator were sent to a water scrubber in which by-product HCl was removed from the excess allyl chloride and nitrogen vapors. These vapors were then passed to a condenser wherein the major part of the excess allyl chloride was condensed and recycled to the reaction column. The fractionator was maintained at 120–140° C. with the higher temperatures being established near the allyl chloride inlet. The temperatures were controlled so that the total residence time of liquid below the steam inlet was about 2 hours.

EXAMPLE 3

Using the apparatus of FIGURE 2, 500 lbs./hr. of dimethyl ortho phthalate and 400 lbs./hr. of allyl chloride were fed into the column which was maintained at 130° C. Introduced with the molten dimethyl phthalate were 12 lbs./hr. of Dowex–50 (sulfonated styrene-divinyl benzene polymer) ion exchange resin as a catalyst. There was no need to neutralize the catalyst and it was removed from the liquid diallyl ortho phthalate product by filtration. The diallyl phthalate was then purified by distillation in the presence of 0.1% of hydroquinone as a polymerization stabilizer.

The process of Example 3 can be carried out in the absence of a catalyst but the yields are lower.

We claim:

1. A process of preparing a dialkenyl ester of a benzene polycarboxylic acid comprising heating reactants consisting of (1) an alkenyl chloride selected from the group consisting of allyl chloride, methallyl chloride and crotyl chloride with (2) a carboxy compound of the group consisting of benzene polycarboxylic acids and anhydrides of such acids and (3) water, there also being added at the start of the process a poly lower alkyl ester of said benzene polycarboxylic acid.

2. A process according to claim 1 wherein the carboxy compound has two carboxy groups.

3. A process of preparing a dialkenyl ester of a benzene polycarboxylic acid comprising heating reactants consisting of an alkenyl chloride selected from the group consisting of allyl chloride, methallyl chloride and crotyl chloride with a lower alkyl ester of a benzene polycarboxylic acid.

4. A process according to claim 3 wherein the benzene polycarboxylic acid has two carboxy groups.

5. A process of preparing a dialkenyl ester of a benzene polycarboxylic acid comprising heating reactants consisting of an alkenyl chloride selected from the group consisting of allyl chloride, methallyl chloride and crotyl chloride with the anhydride of an unsubstituted benzene polycarboxylic acid having 2 to 4 carboxyl groups and steam and removing hydrogen chloride in vapor form, said process also including the step of adding a poly lower alkyl ester of said benzene polycarboxylic acid at the start of the process.

6. A process according to claim 5 which is carried out continuously.

7. A process of preparing a dialkenyl ester of a phthalic acid comprising heating reactants consisting of an alkenyl chloride having 3 to 4 carbon atoms and having the chlorine attached to a terminal carbon atom with a di lower alkyl ester of a phthalic acid, and removing lower alkyl chloride in vapor form.

8. A process according to claim 7 wherein the alkyl ester is an ester of terephthalic acid.

9. A process according to claim 7 wherein the alkyl ester is an ester of isophthalic acid.

10. A process according to claim 7 wherein the alkyl ester is an ester of ortho phthalic acid.

11. A process according to claim 7 wherein the di lower alkyl ester employed is a dimethyl phthalate.

12. A process of preparing diallyl ortho phthalate comprising heating reactants consisting of allyl chloride with dimethyl ortho phthalate, and removing methyl chloride in vapor form.

13. A process of preparing a dialkenyl ester of a phthalic acid comprising heating reactants consisting of an alkenyl chloride selected from the group consisting of allyl chloride, methallyl chloride and crotyl chloride with water and with a phthalic acid, and removing hydrogen chloride in vapor form, there also being added at the start of the process a di lower alkyl phthalate.

14. A process of preparing a dialkenyl ester of ortho phthalic acid comprising heating reactants consisting of a member of the group consisting of allyl chloride, methallyl chloride and crotyl chloride with dimethyl ortho phthalate, and removing methyl chloride in vapor form.

15. A process of preparing diallyl ortho phthalate comprising heating reactants consisting of allyl chloride with dimethyl ortho phthalate, and removing methyl chloride in vapor form.

16. A process of preparing a dialkenyl ester of ortho phthalic acid comprising heating reactants consisting of a member of the group consisting of allyl chloride, methallyl chloride and crotyl chloride with phthalic anhydride and water vapor, and removing hydrogen chloride in vapor form, there also being added at the start of the process a di lower alkyl ester of ortho-phthalic acid.

17. A process according to claim 16 carried out in the presence of an acid esterification catalyst.

18. A process of preparing diallyl ortho phthalate comprising heating reactants consisting of allyl chloride with phthalic anhydride and water vapor, and removing hydrogen chloride in vapor form, there also being added at the start of the process a di lower alkyl ester of ortho-phthalic acid.

19. A process of continuously preparing diallyl ortho phthalate comprising initially supplying to a reaction zone a di lower alkyl ester of ortho phthalic acid, heating said reaction zone and continuously supplying to said hot reaction zone allyl chloride, phthalic anhydride and water vapor as the sole reactants, and removing hydrogen chloride in vapor form.

20. A process according to claim 19 wherein said alkyl ester is dimethyl ortho phthalate.

21. A process according to claim 20 wherein an acid esterification catalyst is employed.

22. A process according to claim 21 wherein the temperature in the reaction zone is maintained between 120° and 150° C.

23. A process according to claim 22 wherein excess allyl chloride over that required to react with the phthalic anhydride is supplied to the reaction zone, the excess allyl chloride is removed as vapor and condensed and is again furnished to the reaction zone.

References Cited by the Examiner
UNITED STATES PATENTS 3,086,985  4/1963  Stange et al. _____ 260—475

LORRAINE A. WEINBERGER, Primary Examiner.

LEON ZITVER, RICHARD K. JACKSON, Examiners.

R. E. MASSA, T. L. GALLOWAY, Assistant Examiners.